(12) United States Patent
Fujimori et al.

(10) Patent No.: US 9,905,062 B2
(45) Date of Patent: Feb. 27, 2018

(54) WORK MACHINE INCLUDING INFORMATION COLLECTING SYSTEM

(71) Applicant: Komatsu Ltd., Tokyo (JP)

(72) Inventors: Toshiyuki Fujimori, Hiratsuka (JP); Shunsuke Sugimura, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/232,718

(22) PCT Filed: Jul. 22, 2013

(86) PCT No.: PCT/JP2013/069830
§ 371 (c)(1),
(2) Date: Jan. 14, 2014

(87) PCT Pub. No.: WO2014/141495
PCT Pub. Date: Sep. 18, 2014

(65) Prior Publication Data
US 2015/0371464 A1 Dec. 24, 2015

(30) Foreign Application Priority Data
Mar. 14, 2013 (JP) ................................ 2013-052468

(51) Int. Cl.
*G07C 5/08* (2006.01)
*G05B 15/02* (2006.01)
(Continued)

(52) U.S. Cl.
CPC .......... *G07C 5/0841* (2013.01); *E02F 9/2054* (2013.01); *E02F 9/267* (2013.01);
(Continued)

(58) Field of Classification Search
None
See application file for complete search history.

(56) References Cited

U.S. PATENT DOCUMENTS 6,615,114 B1* 9/2003 Skiba et al. .................. 700/275
6,745,151 B2* 6/2004 Marko et al. ................. 702/182
(Continued)

FOREIGN PATENT DOCUMENTS

CN 102216534 A 10/2011
JP 06-261408 A 9/1994
(Continued)

OTHER PUBLICATIONS

Office Action dated Feb. 20, 2015, issued for the corresponding German Patent Application No. 11 2013 000 117.9 and English translation thereof.
(Continued)

*Primary Examiner* — Krishnan Ramesh
(74) *Attorney, Agent, or Firm* — Locke Lord LLP

(57) ABSTRACT

The work machine includes a controller including a first storage unit capable of storing work machine information and capable of rewriting the stored work machine information, and a processing unit configured to collect the work machine information, and when trigger information for causing the first storage unit to start storing the work machine information occurs, the processing unit causes at least a portion of the collected work machine information to be stored to the first storage unit. The first storage unit stores header information. At a time when the trigger information occurs, the processing unit generates the work machine data from the collected work machine information in accordance with the header information and stores the work machine data to the first storage unit.

16 Claims, 11 Drawing Sheets

(51) Int. Cl.
*E02F 9/20* (2006.01)
*E02F 9/26* (2006.01)
*G07C 5/00* (2006.01)

(52) U.S. Cl.
CPC ............ *G05B 15/02* (2013.01); *G07C 5/085* (2013.01); *G07C 5/008* (2013.01)

(56) References Cited

U.S. PATENT DOCUMENTS

| | | | |
|---|---|---|---|
| 6,836,712 B2* | 12/2004 | Nishina | 701/33.4 |
| 7,020,546 B2* | 3/2006 | Nagai et al. | 701/33.4 |
| 7,089,096 B2* | 8/2006 | Liebl et al. | 701/33.4 |
| 8,407,994 B2* | 4/2013 | Kamoshida et al. | 60/431 |
| 8,532,865 B2* | 9/2013 | Suzuki et al. | 701/29.1 |
| 8,880,281 B2* | 11/2014 | Giles et al. | 701/33.4 |
| 2003/0033062 A1* | 2/2003 | Nishina | 701/35 |
| 2003/0216889 A1* | 11/2003 | Marko et al. | 702/182 |
| 2006/0212195 A1* | 9/2006 | Veith et al. | 701/35 |
| 2008/0086321 A1* | 4/2008 | Walton | 705/1 |
| 2008/0122603 A1* | 5/2008 | Plante et al. | 340/439 |
| 2008/0234890 A1* | 9/2008 | Okada et al. | 701/35 |
| 2010/0058752 A1* | 3/2010 | Kamoshida et al. | 60/431 |
| 2010/0070130 A1* | 3/2010 | Suzuki et al. | 701/35 |
| 2011/0213526 A1* | 9/2011 | Giles et al. | 701/35 |
| 2011/0227744 A1* | 9/2011 | Shibata et al. | 340/679 |

FOREIGN PATENT DOCUMENTS

| | | |
|---|---|---|
| JP | 2000-298748 A | 10/2000 |
| JP | 2004-234437 A | 8/2004 |
| JP | 2009-237798 A | 10/2009 |
| JP | 2010-156152 A | 7/2010 |
| JP | 2011-070397 A | 4/2011 |

OTHER PUBLICATIONS

International Search Report dated Aug. 13, 2013, issued for PCT/JP2013/069830.

* cited by examiner

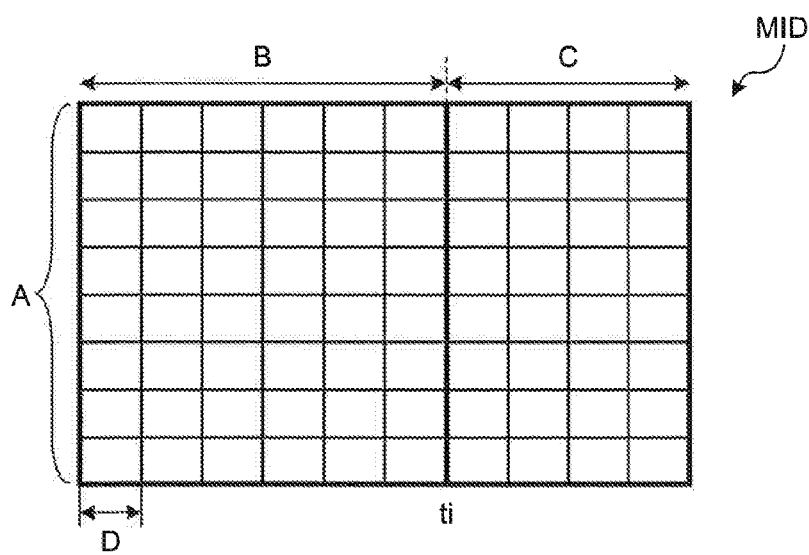

FIG.7

| ITEM | C1 | C2 | C3 |
|---|---|---|---|
| REGION | 1, 2 | 3, 4, 5 | 1, 2, 8 |
| TGM1 | NO | NO | DESIGNATED |
| TGM2 | - | - | ERROR CODE |
| MODE | OVERWRITE | OVERWRITE | PROTECTED |
| A | 40 | 20 | 20 |
| B | 100 | 220 | 120 |
| C | 20 | 20 | 120 |
| D | 50 ms | 50 ms | 200 ms |
| MI1 | ENGINE ROTATION SPEED | ← | ← |
| MI2 | HYDRAULIC OIL PRESSURE | ← | VOLTAGE |
| ⋮ | ⋮ | ⋮ | ⋮ |
| MIk | - | - | VEHICLE SPEED |
| MI1_AD | ○○×× | ××○○ | ×△○△ |
| MI2_AD | ○○○× | △○○○ | ×○○○ |
| ⋮ | ⋮ | ⋮ | ⋮ |
| MIk_AD | - | - | ×××○ |

CONF

RC1: ITEM, REGION, TGM1, TGM2
RC2: MODE, A, B, C, D
RC3: MI1, MI2, ⋮, MIk
RC4: MI1_AD, MI2_AD, ⋮, MIk_AD

FIG.8

| ITEM | C1 | C2 | C3 |
|---|---|---|---|
| ED_BT | | | |
| ED_AT | | | |
| ON_TIME | | | |
| B_SC | | | |
| HV1 | | | |
| HV2 | | | |
| ⋮ | | | |
| HVn | | | |
| HVT1 | | | |
| HVT2 | | | |
| ⋮ | | | |
| HVTn | | | |
| MI1 | | | |
| MI2 | | | |
| ⋮ | | | |
| MIk | | | |

WORK MACHINE INCLUDING INFORMATION COLLECTING SYSTEM

FIELD

The present invention relates to a work machine.

BACKGROUND

Work machines including conveying machines such as forklift and construction machines or mining machines such as excavator and dump truck are used in various kinds of construction sites. In some of such work machines, abnormality of the work machine is monitored by detecting occurrence of the abnormality on the basis of operation information of the work machine which is received from various kinds of sensors. For example, Patent Literature 1 describes a technique for storing snapshot data according to the occurred abnormality to a snapshot data storage unit, on the basis of the order of priority defined in accordance with the degree of urgency for coping with the occurred abnormality.

CITATION LIST

Patent Literature

Patent Literature 1: Japanese Patent Laid-Open No. 2011-70397

SUMMARY

Technical Problem

By the way, the storage capacity of the storage unit for storing information about the work machine such as operation information of the work machine is limited. Therefore, an apparatus for collecting information about the work machine and retrieving the collected information to the external unit is required to have means for effectively using the capacity of the storage unit of which capacity is limited.

An object of the present invention to, when collecting information about a work machine from the work machine, effectively make use of hardware resources at the work machine, and more particularly, a storage unit.

Solution to Problem

According to the present invention, there is provided a work machine comprising: a controller including: a storage unit capable of storing work machine information which is information about the work machine; and a processing unit configured to collect the work machine information, and when trigger information for causing the storage unit to start storing the work machine information occurs, the processing unit causes at least a portion of the collected work machine information to be stored to the storage unit, wherein the storage unit stores definition information which is information for generating work machine data including time-series data in which data collected at multiple points in time are selected for at least one type of work machine information from among multiple types of the work machine information, trigger time data which includes at least one piece of work machine information of a type different from the time-series data, in which data collected at a time when the trigger information occurs is selected, and a number of pieces of work machine information per one type is less than the time-series data, and at a time when the trigger information occurs, the processing unit generates the work machine data from the work machine information collected according to the definition information, and stores the work machine data to the storage unit.

In the present invention, it is preferable that the trigger time data are one piece of data for one type of work machine information.

In the present invention, it is preferable that the definition information can be rewritten by an external unit provided outside of the controller.

In the present invention, it is preferable that the trigger time data include at least an external air temperature, an atmospheric pressure, and position information about the work machine.

In the present invention, it is preferable that the work machine, further comprises a plurality of the controllers, wherein each of the controllers can individually set the definition information.

In the present invention, it is preferable that the work machine, further comprises a communication unit for communicating with the external unit provided outside of the controller, wherein the definition information can be rewritten by the external unit provided outside of the controller by wireless communication via the communication unit.

In the present invention, it is preferable that the trigger time data are described in a region provided at a head of the time-series data and describing at least information for interpreting the time-series data.

According to the present invention, there is provided a work machine comprising: a controller including: a storage unit capable of storing work machine information which is information about the work machine; and a processing unit configured to collect the work machine information, and when trigger information for causing the storage unit to start saving the work machine information occurs, the processing unit causes at least a portion of the collected work machine information to be stored to the storage unit, wherein the storage unit stores definition information which is information for generating work machine data including time-series data in which data collected at multiple points in time are selected for at least one type of work machine information from among multiple types of the work machine information, trigger time data which includes at least one piece of work machine information of a type different from the time-series data and in which data collected at a time when the trigger information occurs is selected, at a time when the trigger information occurs, the processing unit generates the work machine data from the work machine information collected according to the definition information, and stores the work machine data to the storage unit, and the storage unit is different from a storage unit for storing a command for executing operation in which the processing unit causes the work machine information to be stored to the storage unit.

In the present invention, it is preferable that for a same type of work machine information, the processing unit generates multiple different pieces of work machine data having different combinations of a number of pieces of work machine information collected by the processing unit before the trigger information, a number of pieces of work machine information collected by the processing unit after the trigger information, and a time interval with which the processing unit collects the work machine information.

In the present invention, it is preferable that the type of the work machine information can be changed.

In the present invention, it is preferable that the storage unit stores multiple types of definition information.

In the present invention, it is preferable that the multiple types of definition information can be changed individually from an external unit provided outside of the controller.

With the present invention, when information about a work machine is collected from the work machine, hardware resources at the work machine can be effectively made use of, and more particularly, a storage unit is can be effectively made use of.

BRIEF DESCRIPTION OF DRAWINGS

FIG. 4 is a figure illustrating a format when work machine information is saved to a first storage unit.

FIG. 5 is a figure illustrating an example where a condition for storing the work machine information to the first storage unit is changed.

FIG. 7 is a figure illustrating an example of a definition file.

FIG. 8 is a figure illustrating an example of work machine data.

DESCRIPTION OF EMBODIMENTS

Mode for carrying out the present invention (embodiment) will be hereinafter explained in detail with reference to drawings. The present invention is not limited by the contents described in the embodiment below. In the embodiment explained below, an excavator will be explained as an example of work machine, but the work machine which is the subject of the embodiment explained below is not limited thereto. The work machine may be, for example, a forklift, a wheel loader, a dump truck, and the like.

<Overall Configuration of Work Machine>

Figure 1:
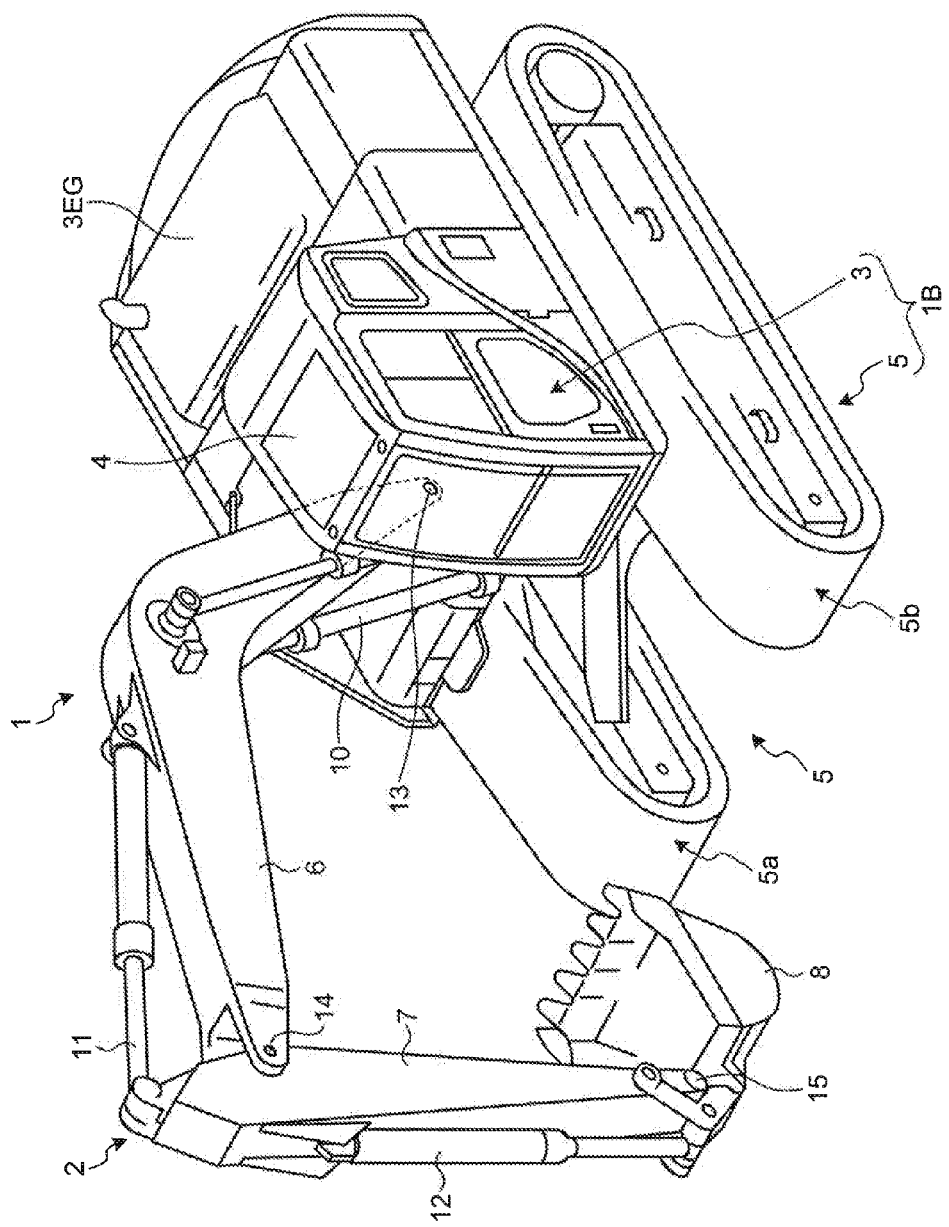
FIG. 1 is a perspective view illustrating a work machine according to the present embodiment.

FIG. 1 is a perspective view illustrating a work machine according to the present embodiment. In the present embodiment, the work machine 1 is an excavator. The work machine 1 includes a work device 2 and a vehicle main body 1B serving as a main body unit. The vehicle main body 1B includes an upper swing body 3 and a driving device 5. The upper swing body 3 accommodates apparatuses such as a force generation device and hydraulic pump, not illustrated, in an engine room 3EG. The engine room 3EG is arranged at an end of the upper swing body 3.

In the present embodiment, the work machine 1 uses, for example, an internal combustion engine such as a diesel engine as the force generation device, but the work machine 1 is not limited thereto. For example, the work machine 1 may be provided with, a so-called hybrid force generation device which is a combination of an internal combustion engine, a generator motor, and an electric storage device.

The upper swing body 3 has an operator's cabin 4. The operator's cabin 4 is placed at the other end side of the upper swing body 3. More specifically, the operator's cabin 4 is provided at a side opposite to the side where the engine room 3EG is arranged. A display input device and an operation device, not illustrated, are arranged in the operator's cabin 4. The driving device 5 has crawler belts 5a, 5b. The driving device 5 causes the work machine 1 to drive when a hydraulic motor, not illustrated, drives to rotate and run the crawler belts 5a, 5b. The work device 2 is arranged at a side of the operator's cabin 4 of the upper swing body 3.

The work machine 1 may have tires instead of the crawler belts 5a, 5b, and may have a driving device capable of transmitting driving force of a diesel engine, not illustrated, to the tires via a transmission, and the work machine 1 can drive. For example, the work machine 1 in such mode may be a wheel-type excavator. The work machine 1 may be, for example, a backhoe loader which has a driving device having such tires, and further a work device attached to a vehicle main body (main body unit), and has a structure having an upper swing body as illustrated in FIG. 1, and a rotation mechanism therefor. More specifically, the backhoe loader has a work device attached to a vehicle main body and a driving device constituting a portion of the vehicle main body.

The upper swing body 3 is such that a side where the work device 2 and the operator's cabin 4 are arranged is the front, and a side where the engine room 3EG is arranged is the back. The left side when facing the front is the left of the upper swing body 3. The right side when facing the front is the right of the upper swing body 3. The work machine 1 or the vehicle main body 1B is such that the driving device 5 is the lower side with respect to the upper swing body 3, and the upper swing body 3 is the upper side with respect to the driving device 5. When the work machine 1 is arranged on a horizontal plane, the lower side is the vertical direction, i.e., the direction in which the gravity acts, and the upper side is the opposite of the vertical direction.

The work device 2 includes a boom 6, an arm 7, a bucket 8, a boom cylinder 10, an arm cylinder 11, and a bucket cylinder 12. The base end portion of the boom 6 is swingably attached to the front portion of the vehicle main body 1B via a boom pin 13. The base end portion of the arm 7 is swingably attached to the distal end portion of the boom 6 via an arm in 14. The bucket 8 is swingably attached to the distal end portion of the arm 7 via a bucket pin 15.

The boom cylinder 10, the arm cylinder 11, and the bucket cylinder 12 as illustrated in FIG. 1 are hydraulic cylinders respectively driven by pressures of operation oils (hereinafter referred to as hydraulic pressures as necessary). The boom cylinder 10 drives the boom 6, and raises or lowers this. The arm cylinder 11 drives the arm 7, and causes the arm 7 to rotate around the arm pin 14. The bucket cylinder 12 drives the bucket 8, and rotates the bucket 3 around the bucket pin 15. A proportional control valve, not illustrated, is arranged between a hydraulic pump, not illustrated, and the hydraulic cylinders such as the boom cylinder 10, the arm cylinder 11, and the bucket cylinder 12. When the proportional control valve is controlled, the amounts of operations oils provided to the boom cylinder 10, the arm cylinder 11, and the bucket cylinder 12 are controlled. As a result, the operations of the boom cylinder 10, the arm cylinder 11, and the bucket cylinder 12 are controlled.

<Information Collection System of Work Machine>

Figure 2:
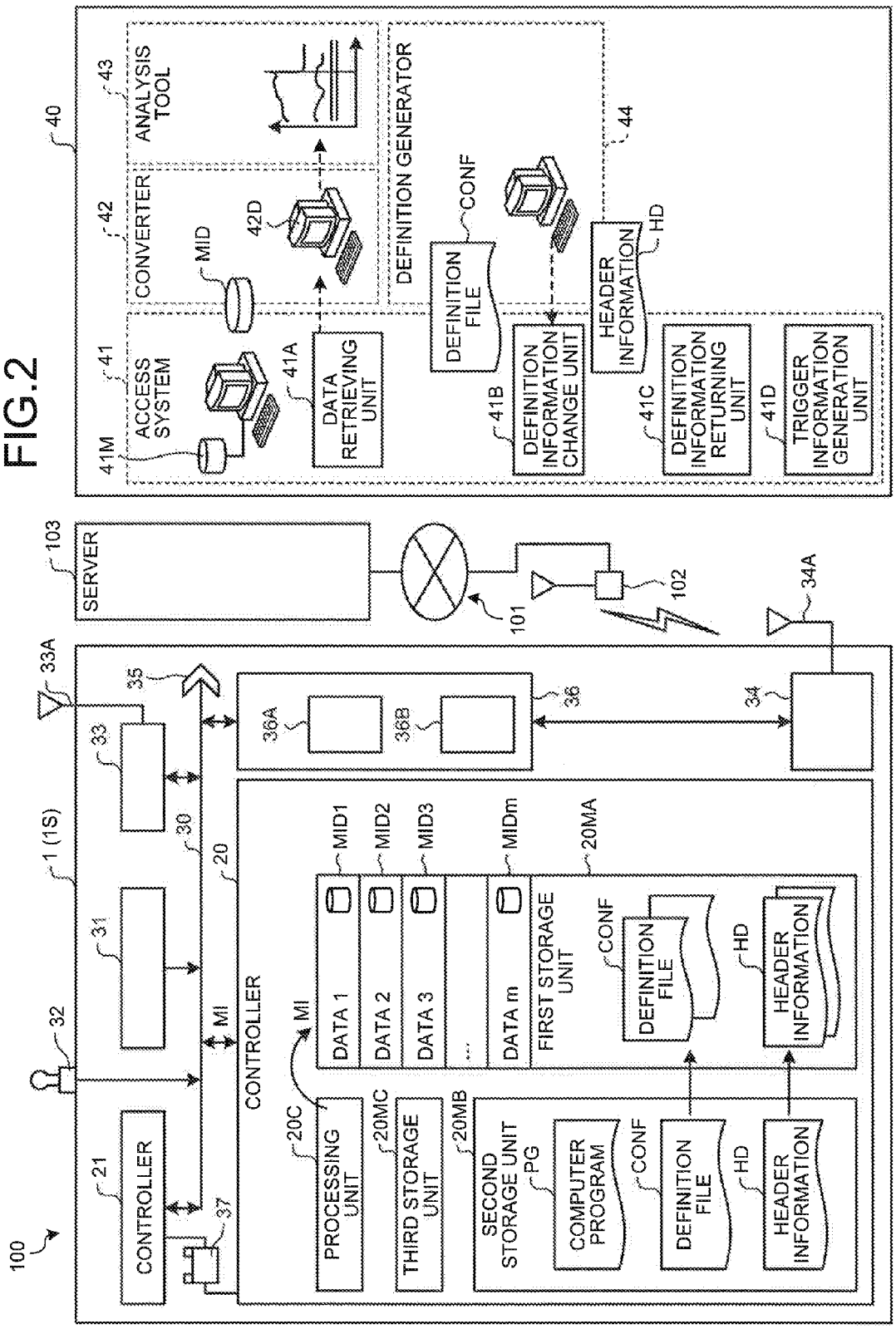
FIG. 2 is a figure illustrating an information collection system of the work machine.

FIG. 2 is a figure illustrating an information collection system 100 of the work machine. The information collection system of the work machine (hereinafter referred to as information collection system as necessary) 100 includes a vehicle-mounted system 1S provided in the work machine 1, and a management system of the work machine (hereinafter referred to as management system as necessary) 40 provided in management facilities. In the information collection system 100, the vehicle-mounted system 1S and the management system 40 exchange information via a communication circuit 101 and a server 103. In the information collection system 100, the management system 40 obtains work machine data MID via the communication circuit 101 from the vehicle-mounted system 1S. The information collection system 100 uses the management system 40 to, by way of the external unit provided outside of the controller 20 of the vehicle-mounted system 1S, rewrites the contents of at least one of the definition file CONF and the header information HD stored in a first storage unit 20MA of the controller. In the present embodiment, for the sake of explanation, the work machine 1, the vehicle-mounted system 1S, and the management system 40 are connected to the information collection system 100 via the communication circuit 101 and the server 103, but the numbers of work machines 1 and management systems 40 are not limited. The information collection system 100 may not have the server 103. In this case, the vehicle-mounted system 1S and the management system 40 exchange information via the communication circuit 101.

(Vehicle-Mounted System 1S Provided in Work Machine 1)

In the vehicle-mounted system 1S provided in the work machine 1, controllers 20, 21, various kinds of sensors 31, a key switch 32, a position detection device 33, and an input output device 36 are connected via a vehicle communication circuit 30, and are configured to communicate with each other. The key switch 32 is provided in proximity to the operator's sheet in the operator's cabin 4. The operator of the work machine 1 manipulates the key switch 32 to start or stop the engine of the work machine 1. For example, the key switch 32 may use the switch of the ignition key. The controllers 20, 21 control the different functions of the work machine 1. For example, the controller 20 is a controller controlling the engine of the work machine 1, and for example, the controller 21 is a controller controlling operation of the hydraulic pump, not illustrated, of the work machine 1. In the vehicle-mounted system 1S, the number of controllers connected to the vehicle communication circuit 30 is not limited to two, and a controller other than the controllers 20, 21 may be connected to the vehicle communication circuit 30.

The controller 20 includes a processing unit 20C, the first storage unit 20MA, a second storage unit 20MB, and a third storage unit 20MC serving as storage units. The processing unit 20C is, for example, a CPU (Central Processing Unit). The third storage unit 20MC uses, for example, DRAM (Dynamic Random Access Memory) or SRAM (Static Random Access Memory). The third storage unit 20MC stores, for example, a computer program describing commands for controlling the work machine 1.

The processing unit 20C collects the work machine information MI serving as information about the work machine 1. In this case, the processing unit 20C collects the work machine information MI via the vehicle communication circuit 30. The processing unit 20C stores the collected work machine information MI to the first storage unit 20MA or the third storage unit 20MC. When trigger information occurs that starts storage of the work machine information MI to the first storage unit 20MA, the processing unit 20C stores the collected work machine information MI to the first storage unit 20MA. In this case, the processing unit 20C stores, to the first storage unit 20MA, at least one type or at least a portion of the collected work machine information MI. The work machine information MI may be information having certain relationship with the work machine 1. For example, the work machine information MI includes information about the state of the work machine 1 detected by the various kinds of sensors 31, information about the state of the vehicle-mounted system 1S of the work machine 1, information about the work environment of the work machine 1 such as an external unit air temperature, an atmospheric pressure, or the like, and ID information for identifying the work machine 1.

The first storage unit 20MA is capable of storing the information and rewriting of the stored information. The first storage unit 20MA can hold the stored information using electricity provided by a power supply (secondary battery such as lead-acid storage battery or nickel-metal hydride storage battery) 37 mounted in the work machine 1. The first storage unit 20MA is, for example, SRAM (Static Random Access Memory). The first storage unit 20MA stores multiple work machine data MID1, MID2, . . . MIDm, and the definition file CONF, and the header information HD serving as definition information. When the work machine data MID1, MID2, . . . MIDm are not distinguished from each other, they are referred to as work machine data MID. In the present embodiment, the first storage unit 20MA can store m (m is an integer) work machine data MID. The number of work machine data MID stored by the first storage unit 20MA is not limited. The number of definition files CONF and pieces of header information HD stored by the first storage unit 20MA are not limited, and may be either a single or multiple pieces. The work machine data MID are made by storing, in time-series, the work machine information MI before and after the trigger information explained above. The details of the definition file CONF will be explained later, but depending on the setting of the definition file CONF and the header information, the work machine data MID can store only information before the trigger information or only information after the trigger information.

The second storage unit 20MB can hold the stored information. The second storage unit 20MB is, for example, ROM (Read Only Memory). The processing unit 20C can read information from the first storage unit 20MA as necessary and store information therein and rewrite the stored information. However, the processing unit 20C can read information from the second storage unit 20MB as necessary, but cannot store information therein and cannot rewrite the stored information. The second storage unit 20MB requires special processing to rewrite the stored information. The second storage unit 20MB stores the computer program PG, the definition file CONF, and the header information HD. The definition file CONF and the header information HD stored in the second storage unit 20MB are information stored in advance, and indicate the contents by default. The computer program PG describes a command for causing the processing unit 20C to interpret the information described in the definition file CONF, and generate the work machine data MID on the basis of the result thereof and store it to a predetermined region of the first storage unit 20MA. The computer program PG may be stored in the third storage unit 20MC.

When the operator operates the key switch 32 to start the engine of the work machine 1, the electricity flows from the power supply 37 to the controller 20, and the processing unit 20C determines whether the header information HD and the information about the definition file CONF stored in the first storage unit 20MA are damaged or not. In this check, the following contents are executed. Inspection values defined in advance is set for the header information HD and the definition file CONF stored in the first storage unit 20MA. More specifically, when the first storage unit 20MA newly stores the definition file and the header information HD, the inspection values unique to the definition file and the header information HD are also stored in the first storage unit 20MA. The inspection value is, for example, the number of types of information included in the definition file CONF, and the header information HD. The inspection value is a different value when the definition file and the header information HD are different. Therefore, this inspection value is not always the same as the inspection value of the definition file CONF, and the header information HD stored in the second storage unit 20MB. Then, every time the key switch 32 is operated and the work machine 1 is started, the inspection values of the definition file CONF and the header information HD stored in the first storage unit 20MA are calculated, and a determination is made as to whether the obtained inspection values are the same as the inspection values stored in advance. If not the same, this indicates that the definition file CONF or the header information HD stored in the first storage unit 20MA are damaged. If this damage is detected, processing unit 20C copies the definition file CONF and the header information HD stored in the second storage unit 20MB to the first storage unit 20MA. Then, when the work machine data MID are generated, the processing unit 20C reads and uses the definition file CONF and the header information HD copied to the first storage unit 20MA. The check using the inspection value as described above is called cyclic redundancy check, and it is based on a method called CRC (Cyclic Redundancy Check).

The controller 21 has the same structure as the controller 20, but the control target is different from the controller 20. Like the controller 20, the controller 21 includes the processing unit 20C, a first storage unit 20MA, the second storage unit 20MB, and the third storage unit 20MC serving as storage units. One of the controller 20 and the controller 21 transmits a command, information, and the like to the other of the controller 20 and the controller 21 via the vehicle communication circuit 30, or the other of the controller 20 and the controller 21 transmits a command, information, and the like to the one of the controller 20 and the controller 21 via the vehicle communication circuit 30.

The vehicle communication circuit 30 is connected to not only the controllers 20, 21 but also the various kinds of sensors 31, the key switch 32, the position detection device 33, the input output device 36, and a service connector 35. The various kinds of sensors 31 are sensors and the like for detecting the state of the work machine 1. The various kinds of sensors 31 include, for example, the rotation speed of the engine (engine speed per unit time), the temperature of the cooling water of the engine (engine cooling water), the voltage of the power supply 37, the pressure of the operation oil (hydraulic oil pressure), the temperature of the operation oil (operation oil temperature), the external unit air temperature of the work machine 1, the atmospheric pressure of the external air of the work machine 1, the speed of the work machine 1 (vehicle speed), and the like.

When the work machine 1 is a wheel loader, for example, the temperature of the operation oil of the torque converter and the temperature of the brake oil are also detected. More specifically, the various kinds of sensors 31 are different in accordance with the vehicle grade and type of the work machine 1. The key switch 32 is the switch of the ignition key. The position detection device 33 is, for example, a device for realizing RTS-GNSS (Real Time Kinematic-Global Navigation Satellite Systems, GNSS means Global Navigation Satellite Systems). The position detection device 33 is antenna 33A for RTK-GNSS. The position detection device 33 detects the current position of the work machine 1. The position detection device 33 is a type of the sensors and the like for detecting the state of the work machine 1. The position detection device 33 may be, for example, a GPS (Global Positioning System) sensor, and a GPS antenna 33A may be used.

The input output device 36 is a control device for inputting and outputting information between the vehicle-mounted system 1S and the external unit of the vehicle-mounted system 1S. In the present embodiment, the input output device 36 includes a gateway 36A and an activation control unit 36B. The gateway 36A is a connection device for connecting the vehicle communication circuit 30 and the communication circuit 101 external unit of the work machine 1. The activation control unit 36B can activate the vehicle-mounted system 1S by turning on the vehicle-mounted system 1S in response to a command from the management system 40. The vehicle-mounted system 1S can also be turned ON by manipulating the key switch 32.

The input output device 36 is connected to a communication unit 34 provided in the vehicle-mounted system 1S provided in the work machine 1. The communication unit 34 includes a communication antenna 34A, and can realize wireless communication with a base station 102. The wireless communication can use a ground wave communication, a satellite communication, or the like. The base station 102 is connected to the communication circuit 101. The communication circuit 101 is connected to the server 103. The communication unit 34 can exchange information with the management system 40 via the base station 102, the communication circuit 101, and the server 103. The service connector 35 is connected to the vehicle communication circuit 30. When, for example, an inspection device is connected to the service connector 35, the states of the controllers 20, 21 or the various kinds of sensors 31 can be inspected, and information stored in the first storage unit 20MA, the second storage unit 20MB, and the like of the controller 20 and the like can be rewritten and read.

(Management System 40)

The management system 40 is connected via the server 103 with the communication circuit 101. The management system 40 includes an access system 41, a converter 42, an analysis tool 43, and a definition generator 44. These are computers. The access system 41 includes a data retrieving unit 41A, a definition information change unit 41B, a definition information returning unit 41C, and a trigger information generation unit 41D.

In the present embodiment, the access system 41, the converter 42, the analysis tool 43, and the definition generator 44 perform data communication with each other as individual computers as illustrated in FIG. 2. However, one computer may be configured to be provided with the functions of the access system 41, the converter 42, the analysis tool 43, and the definition generator 44 to constitute the management system 40. The management system 40 may include the server 103 to make the management system 40.

The data retrieving unit 41A retrieves the work machine data MID from the controllers 20, 21 of the work machine 1, and store the data to a storage device 41M provided in the access system 41. The definition information change unit 41B rewrites the definition file CONF or the header information HD serving as the definition information stored in the first storage unit 20MA such as the controller 20 and the like with the contents of new definition information generated by the definition generator 44. With the rewrite processing of the definition information change unit 41B, the contents of the definition file CONF or the header information HD stored in the first storage unit 20MA are rewritten. As described above, the definition file CONF and the header information HD can be individually changed from the external unit provided outside of the controllers 20, 21. This is also applicable when the first storage unit 20MA stores multiple definition files CONF or pieces of header information HD.

When the contents of the definition file CONF or the header information HD are rewritten from the initial state, the definition information returning unit 41C returns the contents of the definition file CONF or the header information HD back to the default contents as necessary. The default contents of the definition file CONF or the header information HD are the contents of the definition file CONF or the header information HD stored in the second storage unit 20MB such as controller 20 as described above. The definition information returning unit 41C overwrites the definition file CONF or the header information HD stored in the first storage unit 20MA with the definition file CONF or the header information HD stored in the second storage unit 20MB, so that the contents thereof are returned back to the default contents. In this configuration, even after the definition file CONF or the header information HD are rewritten, they can be easily returned back to the default contents.

The trigger information generation unit 41D generates trigger information for storing the work machine information MI detected by the position detection device 33 and the like and the various kinds of sensors 31 or position detection device 33 to the first storage unit 20MA. The trigger information corresponds to a phenomenon occurred in the work machine 1 (event explained later). The access system 41 transmits the trigger information generated by the trigger information generation unit 41D to the controller 20 and the like. Then, the access system 41 transmits the definition file CONF or the header information HD to the vehicle-mounted system 1S. The processing unit 20C generates the work machine data MID from the collected work machine information MI and stores the data to the first storage unit 20MA or the third storage unit 20MC.

The converter 42 obtains the work machine data MID which the data retrieving unit 41A of the access system 41 obtains from the first storage unit 20MA such as the controller 20 of the work machine 1 and stores to the storage device 41M. The converter 42 converts the obtained work machine data MID into a form that can be understood by the operator of the management system 40. At this occasion, the converter 42 uses, for example, the analysis tool 43 to analyze the work machine data MID, and displays the result on a display device 42D. The analysis tool 43 is software for making the work machine data MID into a graph and displaying the graph on the display device 42D, and statistically processing the work machine data MID.

The definition generator 44 generates the contents of the definition file CONF or the header information HD. The processing unit 20C provided in the controller 20 and the like of the work machine 1 interprets the contents described in the definition file CONF, and the header information HD, whereby the work machine data MID are generated from the collected work machine information MI. When the definition file CONF or the header information HD are changed, the type or the number of pieces of data of the work machine information MI included in the work machine data MID generated by the processing unit 20C are changed.

<Collection of Work Machine Information MI>

Figure 3:
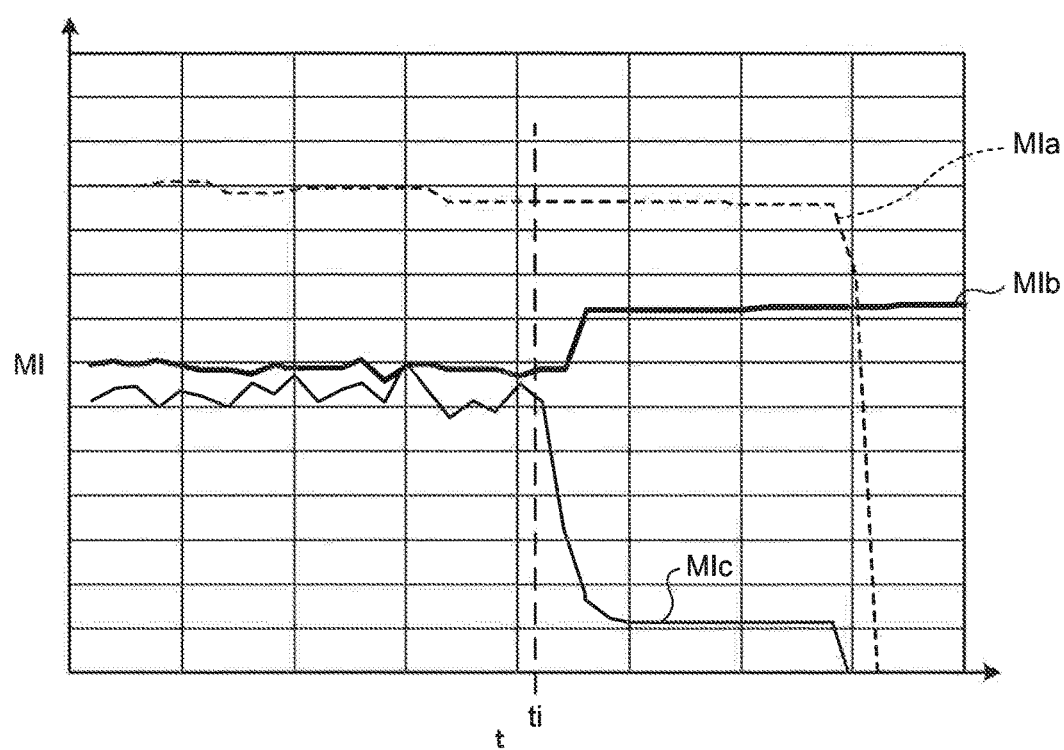
FIG. 3 is a figure illustrating relationship of work machine information and time.

FIG. 3 is a figure illustrating relationship of work machine information MI and time t. FIG. 4 is a figure illustrating a format when the work machine information MI is saved to the first storage unit 20MA. FIG. 5 is a figure illustrating an example where a condition for storing the work machine information MI to the first storage unit 20MA is changed. In the present embodiment, the processing unit 20C of the controller 20 and the like provided in the work machine 1 collects the work machine information MI and stores the information to the first storage unit 20MA while the work machine 1 is operating. Then, when some kind of phenomenon occurs in the work machine 1, the processing unit 20C generates the work machine data MID in accordance with the condition describing the work machine information MI before and after the phenomenon occurs in the definition file CONF, and the header information HD, and stores the data to the first storage unit 20MA.

When the ignition key is used as the key switch 32, "while the work machine 1 is operating" means a period from when the key switch 32 as indicated in FIG. 2 is turned ON by the ignition key to when it is turned OFF. When the key switch 32 is turned ON, the key switch 32 is changed to a so-called accessory position, and the engine is not started, and this case may include a case where electricity is provided from the power supply 37 to electronic appliances such as headlights, not illustrated. The phenomenon occurred in the work machine 1 (hereinafter referred to as event as necessary) means, for example, any failure occurred in the work machine 1 (it may be whether hardware or software) or a case where the engine cooling water temperature, the operation oil temperature, or the like exceeds a predetermined threshold value set in advance. More specifically, in the present embodiment, the event does not mean only the failure occurred in the work machine 1 but also includes a case where although failure does not occur, a sign of occurrence thereof is illustrated. In the present embodiment, when an event occurs in the work machine 1, the processing unit 20C of the controller 20 and the like generates the work machine data MID from the work machine information MI of the predetermined time before and after occurrence of the event, and stores the data to the first storage unit 20MA.

The horizontal axis of FIG. 3 denotes a time t, and the vertical axis denotes the size of physical amount of the work machine information MI. In the example as illustrated in FIG. 3, for example, an event occurs in the work machine 1 at a time ti. In this example, the physical amounts of work machine information MIa, MIb, MIc after the time ti when the event occurred are changed as compared with the state before the time ti when the event occurred. The cause of the event can be found by analyzing the work machine information MI at a predetermined time before and after the time ti when the event occurred. In the present embodiment, when an event occurs in the work machine 1, for example, the processing unit 20C of the controller 20 and the like generates trigger information (hereinafter referred to as trigger as necessary). The trigger can be received via the vehicle communication circuit 30 by the processing unit 20C of all the controllers 20 and the like connected to the vehicle communication circuit 30. The trigger is information for storing, to the first storage unit 20MA, at least one type of or at least a portion of the work machine information MI before and after the event. First, the processing unit 20C receiving occurrence of the trigger generates the work machine data MID in accordance with the conditions described in the definition file CONF, and the header information HD of the first storage unit 20MA, and stores the data to the first storage unit 20MA. It should be noted that a post trigger data number C is 1, and a pre-trigger data number B is two or more, so that the work machine data MID can store only information before the trigger information. Alternatively, a pre-trigger data number B may be 1, and a post trigger data number C may be two or more, so that the work machine data MID can store only information after the trigger information.

One piece of work machine data MID has at least one piece of at least one type of work machine information MI. As illustrated in FIG. 4, the size of the work machine data MID is determined on the basis of the number of types of work machine information MI the number of types of information) A, the pre-trigger data number B, the post trigger data number C, and a sampling time D. It should be noted that ti as illustrated in FIG. 4 is a time when an event occurred as described above. The pre-trigger data number B is the number of pieces of work machine information MI collected by the processing unit 20C before the trigger (the number of one type of work machine information MI). The post trigger data number C is the number of pieces of work machine information MI collected by the processing unit 20C after the trigger (the number of one type of work machine information MI). The sampling time D is a time interval with which the processing unit 20C collects the work machine information MI.

The work machine data MID are stored in a predetermined storage region assigned to the first storage unit 20MA. The storage region of the first storage unit 20MA assigned to one piece of work machine data MID (storage capacity) is a finite size. Where this size is defined as A×(B+C), as illustrated in FIG. 5, the length of a time it takes to collect the work machine information MI recorded in one piece of work machine data MID (which will be referred to as recording time as necessary) L is changed in accordance with the size of the sampling time D. For example, when the sampling time D is 50 ms (milliseconds), the recording time L is 6000 ms, i.e., 6 seconds. As illustrated in FIG. 5, when the number of types of information A increases, the numbers of the pre-trigger data number B and the post trigger data number C decrease, and when the number of types of information A decreases, the numbers of the pre-trigger data number B and the post trigger data number C increase. The number of types of information A, the pre-trigger data number B, the post trigger data number C, and the sampling time D are referred to as storage conditions for the sake of convenience. When at least one of the storage conditions is changed, for example, the number of types of information included in the work machine data MID (the number of types of information) can be changed, or the recording time L can be changed, or the density of the work machine information MI (the number of pieces of work machine information MI per unit time) can be changed.

In the present embodiment, when the controller 20 and the like can change at least one of the pre-trigger data number B, the post trigger data number C, and the sampling time (at least one of not only those listed above but also the number of types of information A when the number of types of information A can be changed) from among the storage conditions by setting or change made from the external unit provided outside of the controller 20 and the like. This is because, as described above, the first storage unit 20MA capable of rewriting the stored information stores the definition file CONF, and the header information HD for setting the storage conditions, and therefore, these contents can be easily rewritten from the external unit provided outside of the controller 20 and the like.

Where at least one of the pre-trigger data number B, the post trigger data number C, and the sampling time D can be set or changed by the external unit provided outside of the controller 20 and the like, e.g., the management system 40, whereby the storage capacity of the storage unit limited, i.e., the storage capacity of the first storage unit 20MA, can be effectively used. More specifically, when it is desired to increase the recording time L even if the density of the work machine information MI is sacrificed, the recording time L can be increased by increasing the sampling time D as illustrated in FIG. 5. In the present embodiment, a summation of the numbers of B and C (B+C) is constant, and therefore, when it is desired to increase the pre-trigger data number B, this may be increased and the post trigger data number C may be decreased, and when it is desired to increase the post trigger data number C, this may be decreased and the pre-trigger data number B may be decreased. The recording time L may be decreased, but when the density of the work machine information MI is to be increased, the sampling time D may be decreased. As described above, in the present embodiment, the storage conditions can be changed from the external unit provided outside of the controller 20 and the like, and therefore, by changing the storage condition in accordance with the types of events, the operator of the management system 40 can easily collect an appropriate number of pieces of work machine information MI at an appropriate recording time, even though the storage capacity of the first storage unit 20MA is limited. As a result, the work machine 1 and the controller 20 and the like effectively makes use of the limited hardware resources, i.e., the storage capacity of the first storage unit 20MA, and the work machine data MID can be effectively made use of.

In the present embodiment, in addition, the number of types of information A can be set or changed. More specifically, at least one of the number of types of information A, the pre-trigger data number B, the post trigger data number C, and the sampling time D can be set or changed. For example, when it is desired to obtain many types of work machine information MI even though the number of work machine information MI (B+C) is sacrificed, the number of types of information A may be increased, and at least one of the pre-trigger data number B and the post trigger data number C may be decreased. When it is desired to obtain many types of work machine information MI over a long period of time even though the density of the work machine information MI is sacrificed, the number of types of information A and sampling time D may be increased, and at least one of the pre-trigger data number B and the post trigger data number C may be decreased. As described above, the number of types of information A can also be set or changed from the external unit provided outside of the controller 20 and the like, and therefore, the operator of the management system 40 can easily collect an appropriate number and types of work machine information MI at an appropriate recording time even though the storage capacity of the first storage unit 20MA is limited. As a result, the work machine 1 and the controller 20 and the like effectively makes use of the limited hardware resources, i.e., the work machine data MID can be effectively made use of. At least one of the pre-trigger data number B, the post trigger data number C, and the sampling time D (at least one of those including the number of types of information A, when the number of types of information A exists) can be set or changed by rewriting the definition file CONF or the header information HD describing them.

Figure 6:
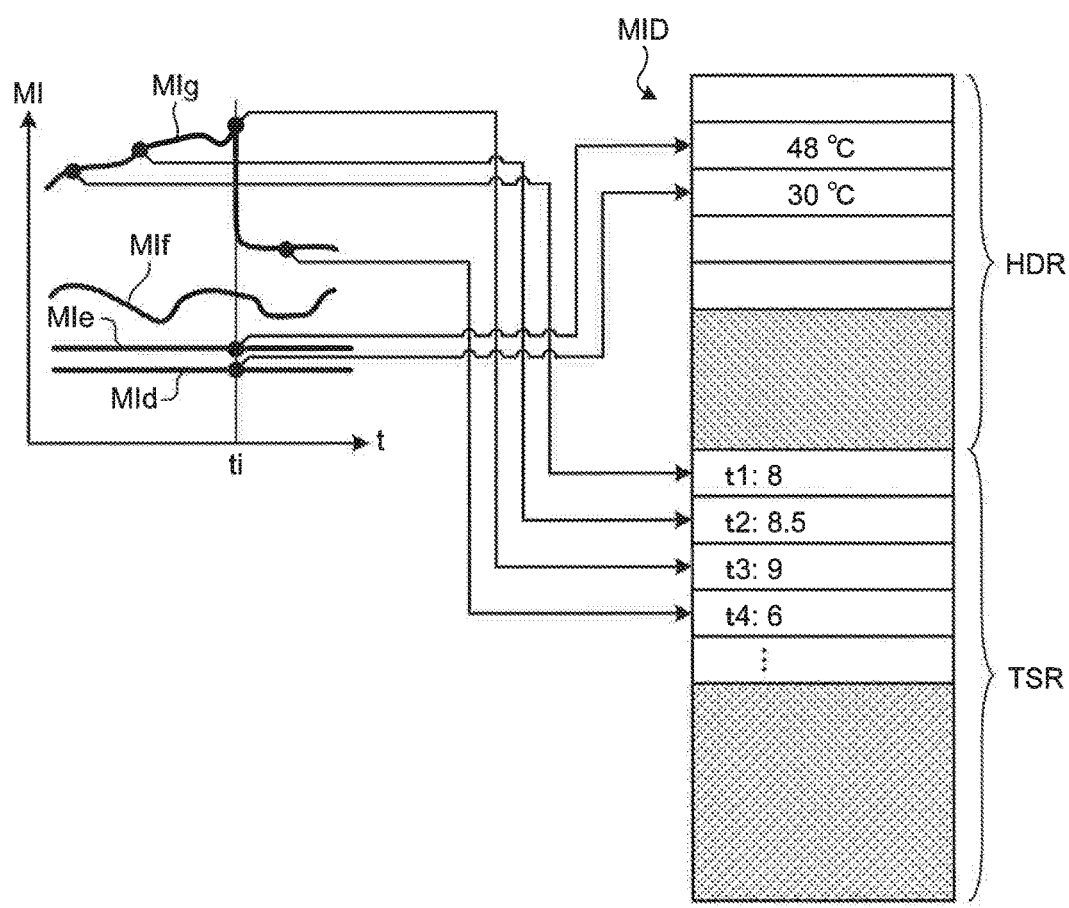
FIG. 6 is a figure illustrating a region for storing an example of structure of work machine data and work machine information MI.

FIG. 6 is a figure illustrating a region for storing an example of structure of the work machine data MID and work machine information MI. In the example illustrated in FIG. 6, a trigger occurs at a time ti. In the present embodiment, the work machine data MID is of a structure of data having the header information storage region HDR and the time-series data storage region TSR. The header information storage region HDR is arranged at the head of the time-series data storage region TSR. The header information storage region HDR stores the work machine information MI designated by the header information HD. The time-series data is at least one type of multiple types of work machine information MI collected at multiple points in time as the time t passes. The time-series data is a group of work machine information stored to the first storage unit 20MA upon multiple types of work machine information MI collected at multiple points in time being selected. In the example as illustrated in FIG. 6, the work machine information MIg corresponds to the time-series data. Four pieces of work machine information MIg are collected as the time t passes, and each is stored to the time-series data storage region TSR in the order in which they are obtained. FIG. 6 indicates that the time passes from t1 to t2, t3, t4, and at the points in time, the physical amounts indicated by the work machine information MIg are 8.5, 9, 6, respectively. Like, e.g., an input signal which is input into the controller 20 and the like via the vehicle communication circuit 30 or a state variable used in the controller 20 and the like, the work machine information MI that changes rapidly over the elapse of time t is such that the value before and after the time ti when the trigger occurs is stored as the time-series data to the time-series data storage region TSR. The work machine information MIf as illustrated in FIG. 6 greatly changes as the time t passes, and therefore it is selected as the time-series data, and stored to the time-series data storage region TSR of the work machine data MID.

The work machine information MI is such that the time-series data are stored to the time-series data storage region TSR, and trigger time data are stored to the header information storage region HDR. The trigger time data are such that one of pieces of work machine information MI that is collected when the trigger occurs is selected, and the number of pieces of work machine information MI per type is less than the time-series data. Physical amounts such as temperatures such as the temperature or the operation oil temperature or the atmospheric pressure are operation machine information MI having such property that does not rapidly change in a short time over the elapse of the time t. Such operation machine information MI is stored to the header information storage region HDR of the work machine data MID as the trigger time data. In the example as illustrated in FIG. 6, the work machine information MId, MIe that do not change rapidly over the elapse of time t are selected as the trigger time data, and stored to the header information storage region HDR. The header information storage region HDR is a region for describing at least information for interpreting the time-series data among the work machine data MID. The information for interpreting the time-series data is, for example, a time when software for generating the work machine data MID is activated, an effective number of pre-trigger data, an effective number of post trigger data, and the like. For example, while the converter 42 of the management system 40 as illustrated in FIG. 2 looks up information for interpreting the time-series data stored in the header information storage region HDR of the work machine data MID, and analyzes multiple pieces of work machine information MI stored in the time-series data storage region TSR.

In the example as illustrated in FIG. 6, the number of trigger time data corresponding to the work machine information MId, MIe is one which is the number when the trigger occurred. The number of time-series data corresponding to the work machine information MIg is four which corresponds to the times t1, t2, t3, t4. More specifically, the total number of trigger time data corresponding to one type of work machine information MI is less than the total number of time-series data corresponding to one type of work machine information MI. In the present embodiment, the processing unit 20C stores those of multiple types of work machine information MI that have property of great change with respect to the elapse of time t to the time-series data storage region TSR of the work machine data MID, and stores those that have property of small change with respect to the elapse of time t to the header information storage region HDR of the work machine data MID. In this configuration, the work machine data MID can increase the time-series data storage region TSR storing the time-series data requiring large storage capacity. More specifically, the work machine data MID can ensure high storage capacity for the work machine information MI with which change over elapse of time is to be found, and therefore, more time-series data before and after the time when the trigger occurred can be stored and provided. As a result, the work machine 1 and the controller 20 and the like effectively makes use of the limited hardware resources, i.e., the first storage unit 20MA, and the work machine data MID can be effectively made use of. It should be noted that the header information HD explained later may be set to any given information, so that those with small change over the elapse of the time t are intentionally set as the time-series data. For example, when there is work machine information MI which is to be checked, and it is desired to determine whether the physical amount really has the property of small change over the elapse of the time t, then the magnitude of the change can be checked by making such settings.

The number of trigger time data per one type of work machine information MI may be less than the number of time-series data, but it is preferably one which is the number when the trigger occurred. In this configuration, with the work machine data MID, still larger storage capacity can be allocated for the time-series data, and therefore, limited hardware resources can be effectively used, and the work machine data MID can be further effectively made use of. The trigger time data may be small change with respect to the elapse of the time t, but the data preferably include at least one of the temperature, the atmospheric pressure, and the position information of the work machine 1 in the environment in which the work machine 1 is used. This is because they are information useful when the event occurred in the work machine 1 is analyzed, and are information that hardly changes in a short time before and after the time when the event occurred in the work machine 1. With the work machine data MID, such work machine information MI is stored to the header information storage region HDR as the trigger time data, so that the work machine information MI useful for analysis of the event can be allocated, and more time-series data can be provided. It should be noted that when the work machine 1 is particularly the excavator or the dump truck, the position information about the work machine 1 hardly changes over the elapsed of the time t while the work machine 1 performs loading work or unloading work.

The type and the like of the trigger time data stored in the header information storage region HDR can be set or changed by rewriting the header information HD stored in the first storage unit 20MA by the external unit provided outside of the controller 20 and the like. More specifically, the header information HD is definition information for generating the work machine data MID having the time-series data and the trigger time data. The header information HD is set such that the work machine information MI of which change over the elapse of the time t is small is stored to the header information storage region HDR of the work machine data MID. The processing unit 20C interprets the header information HD when the work machine data MID are generated, and stores the work machine information MI designated by the header information HD to the header information storage region HDR of the work machine data MID.

When the work machine information MI stored in the header information storage region HDR of the work machine data MID is changed, for example, the definition information change unit 41B of the access system 41 provided in the management system 40 accesses the first storage unit 20MA of the controller 20 and the like via the server 103, the communication circuit 101, the base station 102, and the communication unit 34 of the work machine 1. Then, the definition information change unit 41B transmits new header information HD changed by the definition generator 44 of the management system 40 to the work machine 1, and overwrites the header information HD stored in the first storage unit 20MA. In this configuration, the type and the like of the trigger time data stored in the header information storage region HDR are changed. According to the method explained above, the definition information change unit 41B of the access system 41 can change not only the type of trigger time data but also the header information HD other than that. The type and the like of the trigger time data stored in the header information storage region HDR may be described in the definition file CONF explained above, and the change can be made by changing the type and the like.

The work machine 1 stores the header information describing the type and the like of the trigger time data stored in the definition file CONF and the header information storage region HDR describing the storage condition of the work machine data MID to the first storage unit 20MA capable of rewriting the stored information. The work machine 1 can rewrite the first storage unit 20MA by accessing from the external unit provided outside of the controller 20 and the like, and therefore the type of the trigger time data or the storage condition of the work machine data MID can be easily changed. As a result, for example, this improves flexibility when the management system 40 collects the work machine information MI required for analysis of the event, and in addition, improves the convenience for analyzing the event occurred in the work machine 1.

In other words, when the event occurred in the work machine 1 is failure, the type of the trigger time data or the storage condition of the work machine data MID is changed in order to analyze the cause of the failure, and it becomes easy to identify the cause of the failure by analyzing the obtained work machine data MID. Even if the event is not failure, the type of the trigger time data or the storage condition of the work machine data MID is changed, and the obtained work machine data MID are analyzed, so that it becomes easy to, e.g., determine the necessity of maintenance and find the operation state of the work machine 1.

For example, when the work machine 1 with which an event occurred performs test operation, the type of the trigger time data or the storage condition of the work machine data MID is changed while the work machine 1 is at a stop, i.e., the engine is at a stop, so that the management system 40 can collect more work machine data MID. When the same work machine 1 is performs test operation, and the analysis is somewhat done to find the work machine information MI that greatly affects occurrence of an event, then the sampling time D is reduced for such work machine information MI to perform analysis in more details, and even in such case, the storage condition can be changed from the external unit provided outside of the controller 20 and the like, and therefore, analysis can be done easily.

<Definition File CONF>

FIG. 7 is a figure illustrating an example of a definition file CONF. As Illustrated in FIG. 7, the definition file CONF includes multiple (in this example, four regions) regions RC1, RC2, RC3, RC4. In the present embodiment, the definition file CONF describes definitions C1, C2, C3 about the three types of storage conditions and the like as illustrated in the items. The number of definitions C1, C2, C3 described in the definition file CONF is not particularly limited, and may be one or two or more. In the region of the region RC1, a work area of the first storage unit 20MA stored in the work machine data MID and the work machine information MI is set. In TGM1, TGM2 of the region RC1, a condition with which the controller 20 and the like generates a trigger is set.

In FIG. 7, in a case of the definition C1 or the definition C2, TGM1 is illustrated as NO, but this means that it is recognized as a trigger time no matter which even occurs. In FIG. 7, in a case of the definition C3, TGM1 is designated, but this means that when a designated error code occurs, it is recognized as a trigger time as an event. Therefore, when TGM1 is NO, no description is made in TGM2, but when TGM1 is designated, TGM2 describes the error code designated. For example, a combination of alphanumeric characters such as "E02" is used as the error code. TGM2 of FIG. 7 describes the error code. By changing TGM1, TGM2, for example, it is possible to configure that a time when an error code is received is caused to be recognized as a trigger time, or a time when the work machine information MI becomes more than a predetermined threshold value is caused to be recognized as a trigger time.

The region RC2 describes the storage condition of the work machine data MID. In the mode, a mode when the work machine data MID are stored to the first storage unit 20MA is set. For example, this is a protection mode in which when the region of the first storage unit 20MA for storing the work machine data MID becomes full, overwrite is not done even if the region for storing overwrite mode or work machine data MID which overwrites old work machine data MID becomes full. The number of types of information A of the region RC2, the pre-trigger data number B, the post trigger data number C, and the sampling time D are overwritten, whereby they are changed. The number of types of information A, the pre-trigger data number B, the post trigger data number C, and the sampling time D are generated by the definition generator 44 of the management system 40 as illustrated in FIG. 2, and a determination is made as to whether they are values within the work area.

In the regions RC3 and RC4, specific variable name or variable address of the work machine information MI is defined. More specifically, the region RC3 describes the type of each work machine information MI stored in the work machine data MID. The type of work machine information MI can be changed. In this example, the definition file CONF can set as many as k (k is an integer) pieces of work machine information MI (see FIG. 8). Examples of work machine information MI include the rotation speed of the engine, the hydraulic oil pressure, the voltage of the power supply 37, or vehicle speed. In addition, the work machine information MI may include the voltage of the accessory power supply, the output voltage of the accessory, input commands to the controller 20 and the like, or output commands to the controller 20 and the like. The region RC4 describes a memory address where the work machine information MI exists when the work machine data MID are generated. This memory address is an address of variable described in the computer program PG stored in the second storage unit 20MB or the third storage unit 20MC. When the work machine data MID are generated, the processing unit 20C generates the work machine data MID on the basis of information described in each of the regions RC1 to RC4 of the definition file CONF, and stores the data to a predetermined address of the first storage unit 20MA.

For one piece of work machine data MID, there is one combination of the number of types of information A, the pre-trigger data number B, the post trigger data number C, and the sampling time D. More specifically, one piece of work machine data MID includes multiple pieces of work machine information MI, but a combination of the pre-trigger data number B, the post trigger data number C, and the sampling time D cannot be changed in the work machine information MI. However, a combination of the pre-trigger data number B, the post trigger data number C, and the sampling time D may be changed in different work machine data MID. In the present embodiment, as described above, the first storage unit 20MA can store multiple work machine data MID and definition files CONF. For this reason, for the same type of work machine information MI, the processing unit 20C can generate multiple different work machine data MID in which a combination of the pre-trigger data number B, the post trigger data number C, and the sampling time D is different.

For example, for the same type of work machine information MI, the sampling time D is decreased in one definition file CONF, and a sampling time D is increased in another definition file CONF. When the work machine data MID are generated, the processing unit 20C generates work machine data MID in accordance with two types of definition files CONF as described above. One piece of work machine data MID thus obtained stores detailed information before and after the trigger, and the recording time L is longer for the other work machine data MID. As a result, for the same type of work machine information MI, the same phenomenon that occurred at the same time can be observed with different data density. In the example explained above, the sampling time D is changed, but the generation of the work machine data MID using multiple definition files CONF is not limited to the example explained above.

For example, even for the same grade of the work machine 1, the definition file CONF may be such that the setting of the type and the number of storage conditions and work machine information MI may be changed in accordance with the environment in which they are used (e.g., the climate, or whether used in residential area or mountainous area). For each shipping lot of the work machines 1, the type and the number of storage conditions and work machine information MI may be changed. In this configuration, even when the work machine information MI required in accordance with the environment in which the work machine 1 is used is different, it is easy to cope with such environment. The header information HD is also like the definition file CONF.

In the example explained above, the definition file CONF or the header information HD are changed by means of the access system 41 of the management system 40. However, the embodiment is not limited thereto. For example, an information rewrite device is connected to the service connector 35, the definition file CONF or the header information HD stored in the first storage unit 20MA may be rewritten by means of the vehicle communication circuit 30. In this configuration, even in an environment in which the work machine 1 and the management system 40 cannot communicate by wireless communication or the communication circuit 101, the definition file CONF or the header information HD can be easily changed.

<Work Machine Data MID>

Figure 8:
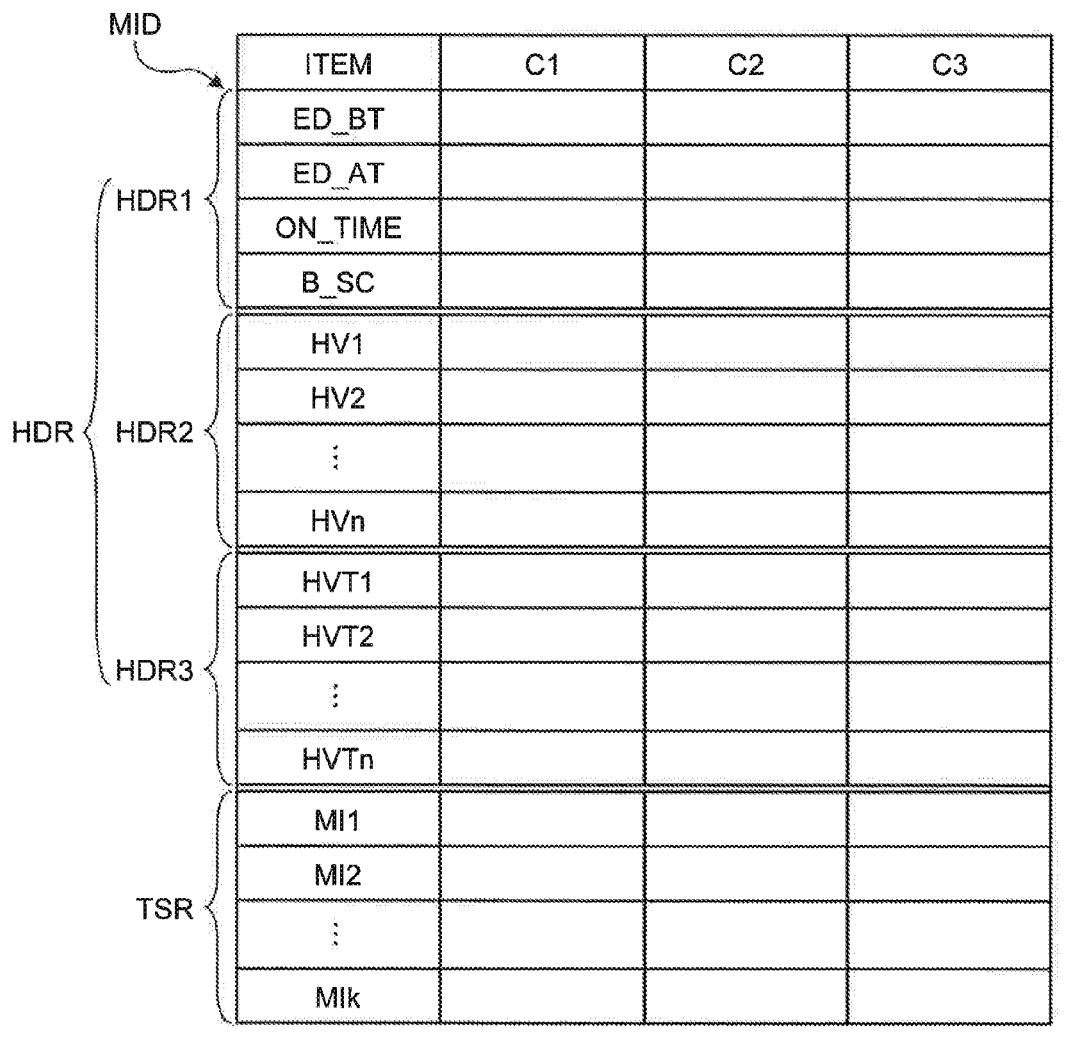

FIG. 8 is a figure illustrating an example of work machine data MID. In the present embodiment, the work machine data MID describes the storage conditions and the like for the definitions C1, C2, C3 about the three types of storage conditions and the like. The number of the definitions C1, C2, C3 about the three types of storage conditions and the like described in the work machine data MID is not particularly limited, and may be one or two or more. In the example as illustrated in FIG. 8, the items corresponding to the definitions C1, C2, C3 about the three types of storage conditions and the like are vacant, but in the actual work machine data MID, the work machine information MI collected by the processing unit 20C is described in the vacant field explained above.

The work machine data MID includes the header information storage region HDR and the time-series data storage region TSR. The header information storage region HDR includes a first region HDR1, a second region HDR2, and a third region HDR3. The first region HDR1 describes, for example, an effective number of pre-trigger data ED_BT, an effective number of post-trigger data ED_AT, a time N_TIME which is a time when the computer program PG is activated for starting generation of the work machine data MID, and a time B_SC which is a time of separation between the pre-trigger data number B and the post trigger data number C.

The second region HDR2 describes the work machine information MI when the trigger occurs in accordance with the header information HD, i.e., n (n is an integer) trigger time data HV1, HV2, . . . HVn. The third region HDR3 describes times HVT1, HVT2, . . . HVTn when the processing unit 20C collects the trigger time data HV1, HV2, . . . HVn. In the time-series data storage region TSR, the work machine information MI (MI1, MI2, . . . MIk) collected by the processing unit 20C is described in accordance with the definition file CONF.

The type and memory address of the work machine information MI described in the regions RC3, RC4 of the definition file CONF as illustrated in FIG. 7 are rewritten by the external unit provided outside of the controller 20 and the like, so that the work machine information MI stored in the time-series data storage region TSR as illustrated in FIG. 8 is changed. The work machine information MI designated by the header information HD is rewritten by the external unit provided outside of the controller 20 and the like, so that the work machine information MI stored in the header information storage region HDR of the work machine data MID is changed.

When the work machine 1 includes multiple controllers 20, 21, each of the controllers 20, 21 can individually set or change the definition file CONF and the header information HD serving as the storage condition and the definition information. In this configuration, each of the controllers 20, 21 obtains the work machine information MI according to the control target of them each under a condition appropriate for the control target thereof, thus generating the work machine data MID.

<Change of Condition for Collecting Work Machine Information MI>

Figure 9:
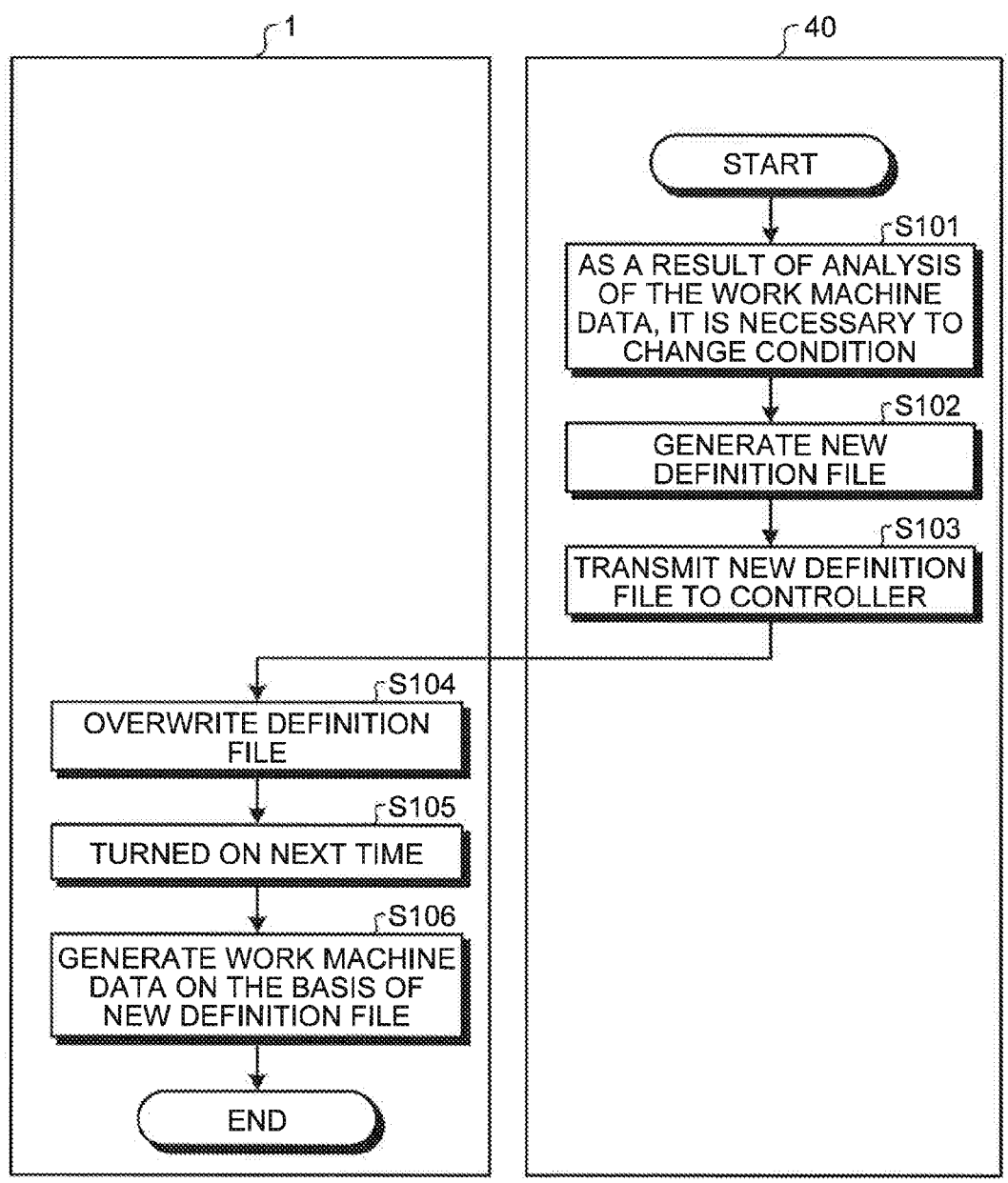
FIG. 9 is a flowchart illustrating an example of procedure for changing a condition for collecting work machine information.

FIG. 9 is a flowchart illustrating an example of procedure for changing a condition for collecting work machine information MI. In this example, the definition file CONF stored in the first storage unit 20MA is rewritten, and accordingly the storage condition and the like are changed, but this example is also applicable to the header information HD. In step S101, suppose that, as a result of analysis of the work machine data MID by the operator of the management system 40, it is necessary to change the storage condition and the like of the controller 20 provided in the work machine 1. In this case, step S102 is subsequently performed, and the operator manipulates the definition generator 44 of the management system 40 as illustrated in FIG. 2, and generates a new definition file CONF. In step S103, the definition information change unit 41B of the access system 41 transmits a new definition file CONF to the controller 20 by wireless communication via the communication unit 34 of the work machine 1 and the communication circuit 101. As described above, by using the wireless communication, the contents of the definition file CONF can be easily rewritten even if the distance between the management system 40 and the work machine 1 is away.

Subsequently, in step S104, the processing unit 20C of the controller 20 having received the new definition file CONF overwrites the current definition file CONF, which is stored in the first storage unit 20MA, with the new definition file CONF. When the processing unit 20C overwrites the new definition file CONF, the controller 20 need to be in the ON state, i.e., the key switch 32 needs to be in the ON state. When the key switch 32 is not in the ON state, then processing is performed as follows. When the activation control unit 36B provided in the input output device 36 of the work machine 1 detects access from the access system 41, it turns on the key switch 32 via the vehicle communication circuit 30, and turns on (energizes) the controller 20.

Even when the definition file CONF is rewritten while the controller 20 is in the ON state, the contents of the new definition file CONF are not yet effective. In step S105, after the new definition file CONF is rewritten, the controller 20 is once turned OFF, and is turned ON again, then, the contents of the new definition file CONF become effective. In step S106, the processing unit 20C generates the work machine data MID in accordance with the contents of the new definition file CONF. As described above, the contents of the definition file CONF are rewritten.

In a case where the definition file CONF is rewritten when the work machine 1 is not used, processing is performed as follows. When the activation control unit 36B detects access from the access system 41 for rewriting the definition file CONF, the key switch 32 is turned ON via the vehicle communication circuit 30, and the controller 20 is turned ON (energized). Subsequently, the processing unit 20C of the controller 20 receives the new definition file CONF, and overwrites the current definition file CONF, which is stored in the first storage unit 20MA, with the new definition file CONF. When overwriting is completed, the activation control unit 36B turns OFF the key switch via the vehicle communication circuit 30, and turns off the controller 20. In this configuration, when the key switch 32 of the work machine 1 is subsequently turned ON again, the contents of the new definition file CONF can be enabled.

<Operation of Controller 20 and the Like>

Figure 10:
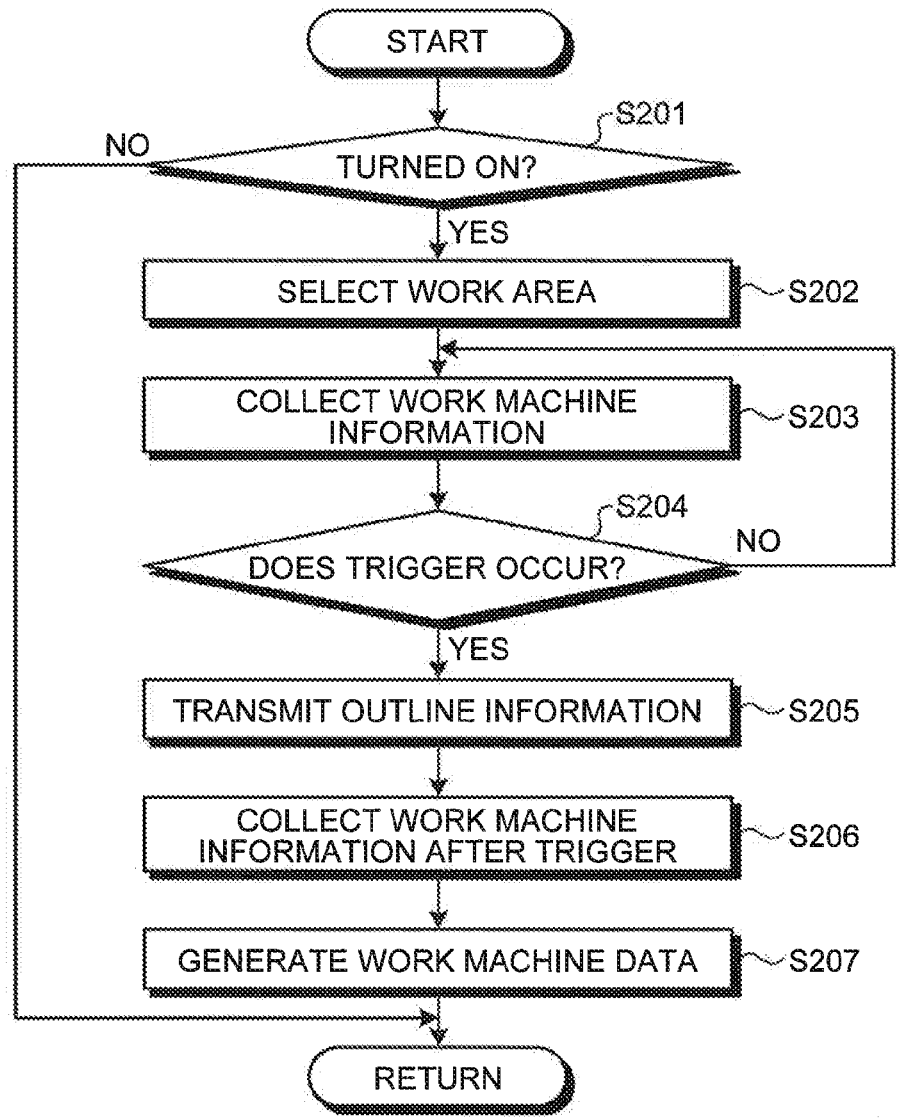
FIG. 10 is a flowchart illustrating an operation example of a controller provided in a work machine 1.
Figure 11:
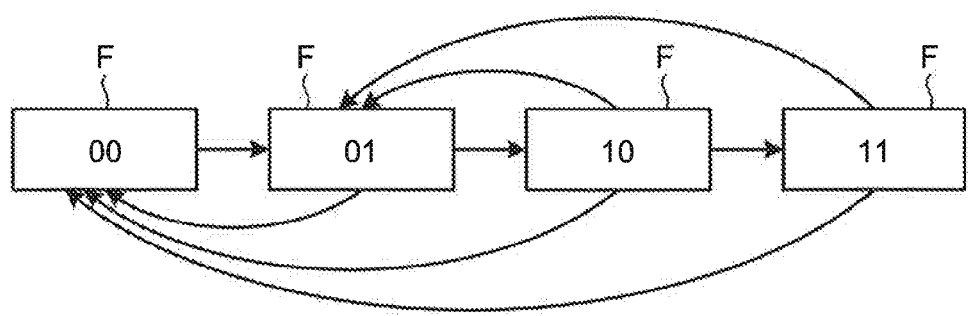
FIG. 11 is a figure illustrating an example of transition of processing flag when the work machine information and work machine data MID are stored to the first storage unit.

FIG. 10 is a flowchart illustrating an operation example of the controller 20 and the like provided in a work machine 1. FIG. 11 is a figure illustrating an example of transition of processing flag F when the work machine information MI and work machine data MID are stored to the first storage unit 20MA. In step S201, when the key switch 32 as illustrated in FIG. 2 is not in the ON state (step S201, No), the work machine 1 is not operating, and therefore, the controller 20 and the like do not collect the work machine information MI, and do not generate the work machine data MID.

In step S201, in a case where the key switch 32 as illustrated in FIG. 2 is turned ON and the controller 20 and the like is turned on (step S201, Yes), the work machine 1 is operating. In this case, the processing unit 20C activates the computer program PG for generating the work machine data MID. In step S202, the processing unit 20C selects a work area for storing the collected work machine information MI. The work area is a region of the first storage unit 20MA where the work machine information MI is stored before the trigger occurs. When the key switch 32 is turned ON, the processing unit 20C interprets the header information HD stored in the first storage unit 20MA, and selects the work area explained above. When the work area is selected, the processing flag F is 00 as illustrated in FIG. 11.

Subsequently, step S203 is subsequently performed, and the processing unit 20C starts collecting the work machine information MI. When the processing unit 20C starts collecting the work machine information MI, the processing unit 20C changes the processing flag F from 00 to 01 as illustrated in FIG. 11. When the processing flag F is 01, the processing unit 20C is in the state of collecting the work machine information MI, i.e., the state before the trigger occurs. At this occasion, when the work area for storing the collected work machine information MI is full, the processing unit 20C erases older work machine information MI in such order that information at the front of the work area is deleted first, and stores new collected work machine information MI in order. When the trigger does not occur, the work machine information MI is kept on being collected, and therefore, the processing unit 20C executes such processing.

When the trigger does not occur in step S204 (step S204, No), the processing unit 200 repeats step S203 and step S204. When the trigger occurs in step S204 (step S204, Yes), the processing unit 20C transmits outline information to the management system 40 in step S205. The outline information is information about outline about the event, and includes the occurrence time of the event and when the event is an error, the outline information includes an error code and the like. In this configuration, as illustrated in FIG. 10, after the trigger occurs, processing for transmitting the outline information to the management system 40 as illustrated in step S205 is executed, and therefore, the operator of the management system 40 can quickly find the event of the work machine which is preferable for the management of the work machine 1.

Subsequently, step S206 is subsequently performed, and the processing unit 20C collects the work machine information MI after the trigger. As illustrated in FIG. 11, the processing unit 20C changes the processing flag F from 01 to 10. When the processing flag F is 10, the processing unit 20C is in such state that the work machine information MI after the trigger occurs is collected and stored to the work area of the first storage unit 20MA.

Subsequently, in step S207, the processing unit 20C generates the work machine data MID on the basis of the definition file CONF and the header information HD, and stores the data to the predetermined region of the first storage unit 20MA. When the work machine data MID are stored to the first storage unit 20MA, the processing flag F is changed from 10 to 11. When the processing flag F is 11, at least one piece of work machine data MID is stored to the first storage unit 20MA. The processing unit 20C stores multiple pieces of work machine information MI, and when the work area is full, the oldest work machine information MI is overwritten with the latest work machine information MI.

It should be noted that the order in which step S205, step S206 and step S207 is executed may be opposite to what has been described above. More specifically, step S206, step S207, and step S205 may be executed in this order. When the series of procedure is finished, the processing unit 20C once terminates the computer program PG for generating the work machine data MID. Then, the processing unit 20C returns back to the start, and executes step S201 to step S207 in order.

<Processing Example 1 of Information Collection System 100>

Figure 12:
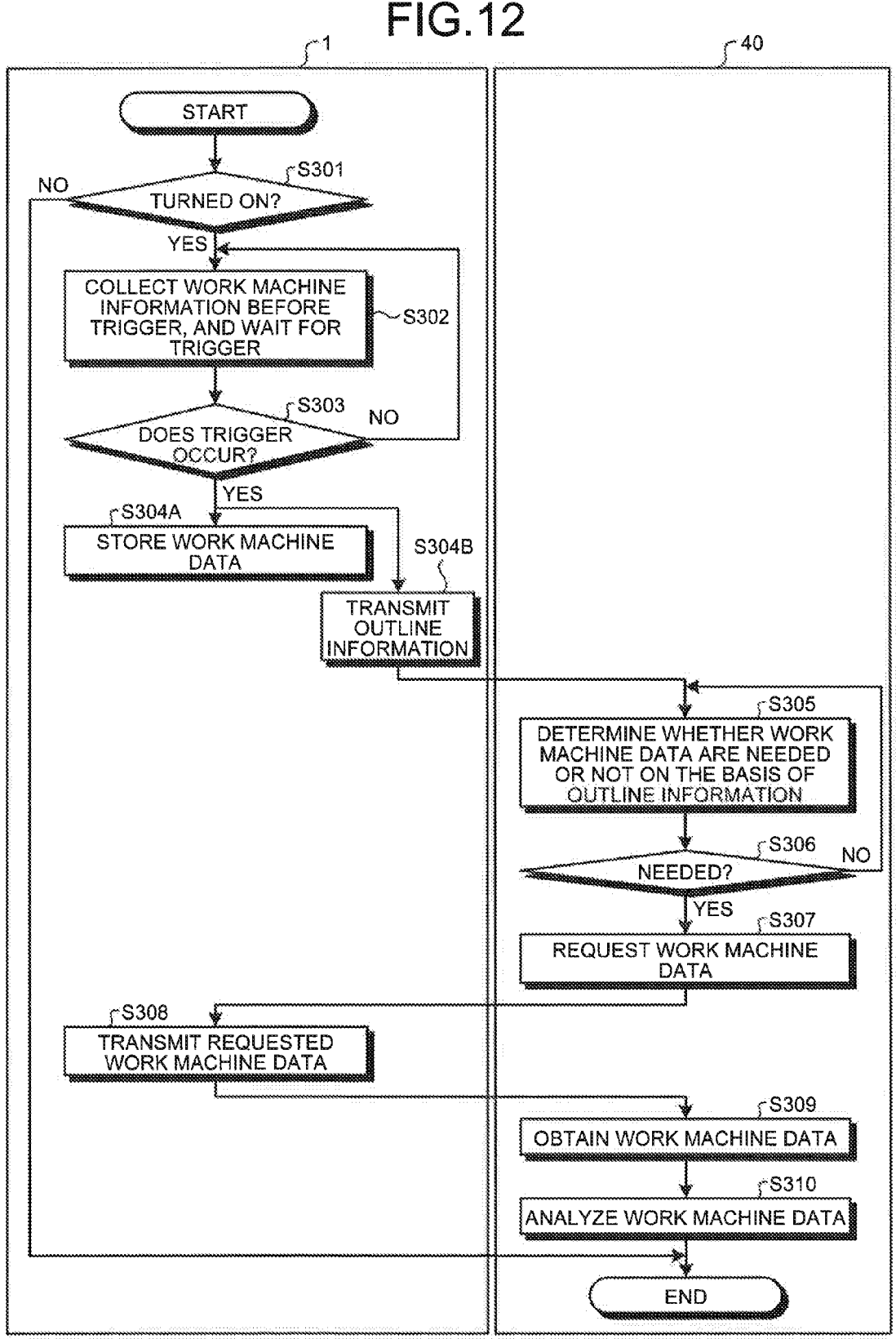
FIG. 12 is a flowchart illustrating processing example of the information collection system.

FIG. 12 is a flowchart illustrating processing example of the information collection system 100. Step S301 to step S304B and step S308 are processing of the work machine 1. Step S305 to step S307, step S309 and step S310 are processing of the management system 40. Step S301 is the same as step S201 explained above, and therefore explanation thereabout is omitted. In step S302 and S303, while the processing unit 20C of the work machine 1 collects the work machine information MI, the processing unit 20C waits until a trigger occurs. When the trigger occurs (step S303, Yes), the processing unit 20C proceeds to processing in step S304A and step S304B.

In step S304A, the processing unit 20C generates the work machine data MID on the basis of the definition file CONF and the header information HD, and stores the data to the predetermined region of the first storage unit 20MA. In step S304B, the processing unit 20C transmits the outline information to the management system 40. The outline information is what has been described above. After the processing unit 20C transmits the outline information, step S301 to step S304B are repeated.

For example, the access system 41 having received the outline information displays, on the display device 42D and the like, the outline information transmitted from at least one of the work machines 1. When multiple work machines 1 transmit the outline information, the display device 42D and the like display the outline information as a list. In step S305, a determination is made as to whether the generated work machine data MID is necessary or not on the basis of the outline information. In the present embodiment, the operator confirming the outline information with the access system 41 determines whether the work machine data MID are necessary or not, but all the work machine data MID may be obtained by the access system 41. The access system 41 may obtain the work machine data MID on the basis of the error code described in the outline information. For example, when the outline information includes an error code that needs to be coped with urgently, the access system 41 may obtain the work machine data MID.

When the work machine data MID are not necessary in step S306 (step S306, No), the access system 41 repeats step S305 and step S306 until subsequent outline information is transmitted from the controller 20 and the like. When the work machine data MID are necessary (step S306, Yes), the access system 41 requests the controller 20 and the like to transmit the work machine data MID is the communication circuit 101 and the server 103 in step S307.

In step S308, the controller 20 and the like having received a signal representing request of transmission of the work machine data MID transmits the requested work machine data MID to the request-source access system 41. In step S309, the access system 41 obtains the work machine data MID transmitted from the controller 20 and the like. Then, in step S310, the converter 42 of the management system 40 analyzes the obtained work machine data MID.

<Processing Example 2 of Information Collection System 100>

Figure 13:
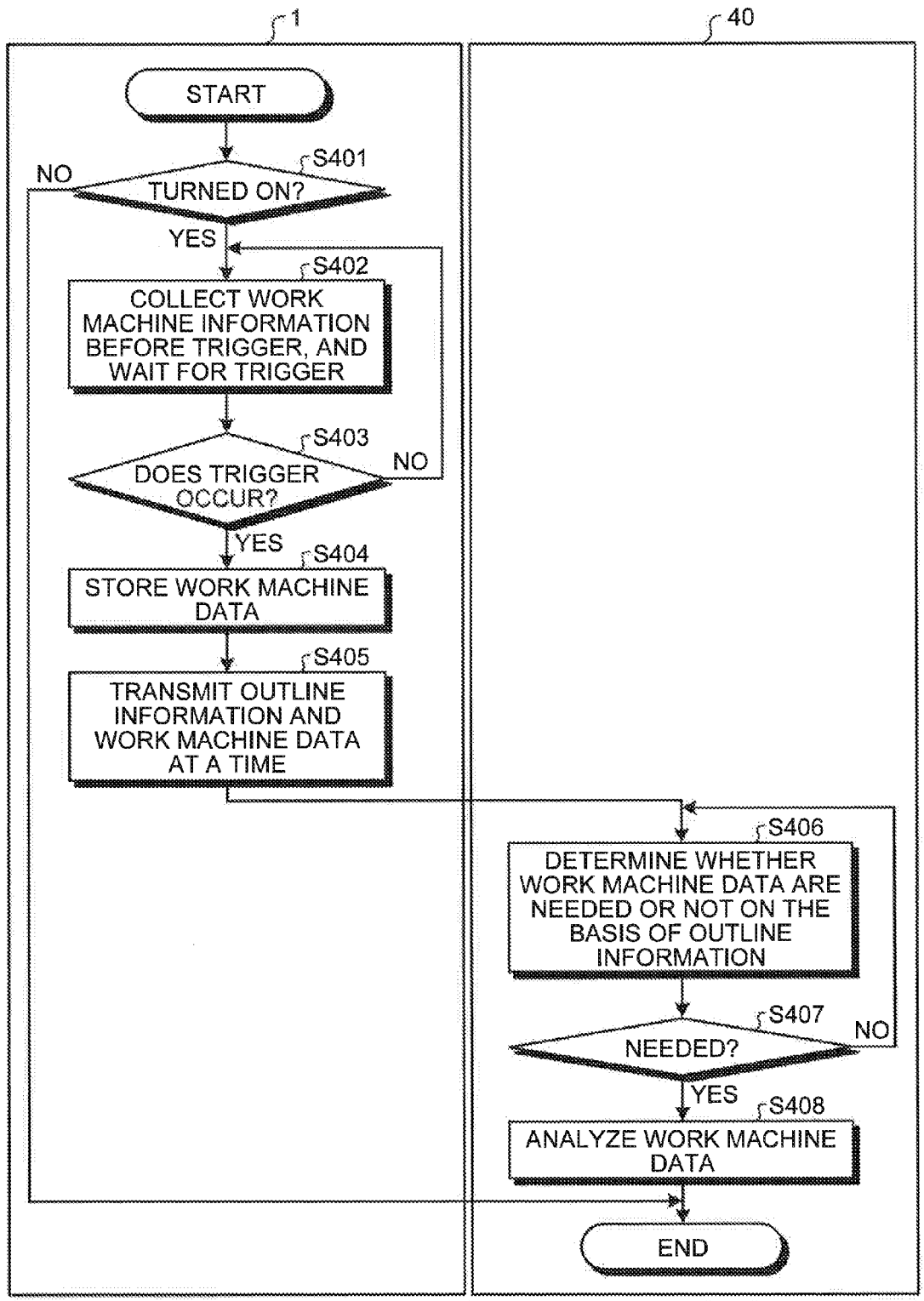
FIG. 13 is a flowchart illustrating processing example of the information collection system.

FIG. 13 is a flowchart illustrating processing example of the information collection system 100. Step S401 to step S405 are processing of the work machine 1. Step S406 to step S408 are processing of the management system 40. Step S401 to step S403 are the same as step S301 to step S303 of the processing example 1 explained above, and therefore explanation thereabout is omitted.

After the trigger occurs (step S403, Yes), the processing unit 20C generates the work machine data MID on the basis of the definition file CONF and the header information HD in step S404, and stores the data to the predetermined region of the first storage unit 20MA. In step S405, the processing unit 20C transmits the outline information and the work machine data MID to the management system 40, i.e., the access system 41. After the outline information and the work machine data MID are transmitted, the processing unit 20C repeats step S401 to step S405.

For example, the access system 41 having received the outline information and the work machine data MID displays, on the display device 42D and the like, the outline information transmitted from at least one of the work machines 1. When multiple work machines 1 transmit the outline information, the display device 42D and the like display the outline information as a list. The access system 41 temporarily stores the received work machine data MID to the storage device 41M. In step S406, a determination as to whether the work machine data MID transmitted from the controller 20 and the like are necessary or not is determined from at least one of the outline information and the work machine data MID. When the work machine data MID are not necessary in step S407 (step S407, No), the access system 41 repeats step S406 and step S407 until subsequent outline information and work machine data MID are transmitted from the controller 20 and the like. The access system 41 may erase unnecessary work machine data MID which are stored in the storage device 41M. When the work machine data MID are necessary (step S407, Yes), the converter 42 obtains the work machine data MID from the storage device 41M of the access system 41. Step S408 is subsequently performed, and the converter 42 analyzes the obtained work machine data MID.

In the present embodiment, when the work machine data MID are generated, the type of work machine information MI stored in the header information storage region HDR of the work machine data MID of the storage condition can be set or changed by the external unit provided outside of the controller 20 and the like. In this configuration, at least one of the type of work machine information MI stored in the header information storage region HDR and the storage condition can be changed in accordance with the type of event. Then, while the storage capacity of the first storage unit 20MA is limited, an appropriate number of pieces of work machine information MI can be easily collected at an appropriate recording time. As a result, the work machine 1 and the controller 20 and the like effectively makes use of the limited hardware resources, i.e., the storage capacity of the first storage unit 20MA, and the work machine data MID can be effectively made use of.

In addition, in the present embodiment, for the work machine information MI stored in the header information storage region HDR, the work machine data MID are such that the number of pieces of data per one type is less than the work machine information MI stored in the time-series data storage region TSR, and more preferably, it is one when the trigger occurs. The work machine data MID stores the work machine information MI, of which change over elapse of time is small, in the header information storage region HDR. In this configuration, the work machine data MID can ensure high storage capacity for the work machine information MI with which change over elapse of time is to be found, and therefore, more time-series data before and after the time when the trigger occurred can be stored and provided.

Alternatively, even when configuration is made to collect time-series data only before the time when the trigger occurs or time-series data only after the time when the trigger occurs, work machine data MID can obtain large storage capacity for the work machine information MI of which change over elapse of time is to be found. Therefore, more time-series data before or after the time when a trigger occurs can be stored and provided. As a result, the work machine 1 and the controller 20 and the like effectively makes use of the limited hardware resources, i.e., the first storage unit 20MA, and the work machine data MID can be effectively made use of.

In the present embodiment, multiple controllers 20, 21 individually collect the work machine information MI, and generate the work machine data MID. This eliminates the necessity of a device for successively collecting the work machine information MI from the controllers 20, 21 and generating the work machine data MID, and therefore, this can reduce the delay in time when collecting the work machine information MI. As a result, simultaneousness of the work machine information MI and the work machine data MID between multiple controllers 20, 21 can also be ensured.

While certain embodiments have been described, these embodiments are not intended to limit the scope of the inventions. Further, it should be noted that components described herein may be replaced with other components that are obvious to those skilled in the art and are substantially equal, i.e., are equivalent. Further, the components described above may be combined on an optional basis. Various omissions, substitutions and changes in the form of the embodiments described herein may be made without departing from the spirit of the embodiments.

REFERENCE SIGNS LIST 1 work machine
1S vehicle-mounted system
2 work device
3 upper swing body
4 operator's cabin
5 driving device
20, 21 controller
20C processing unit
20MA first storage unit
20MB second storage unit
20MC third storage unit
30 vehicle communication circuit
31 sensors
32 key switch
33 position detection device
34 communication unit
35 service connector
36 input output device
36A gateway
36B activation control unit
37 power supply
40 management system (management system of work machine)
41 access system
41A data retrieving unit
41B definition information change unit
41C definition information returning unit
41D trigger information generation unit
41M storage device
42 converter
42D display device
43 analysis tool
44 definition generator
100 information collection system (information collection system of work machine)
101 communication circuit
102 base station
103 server
A number of types of information
B pre-trigger data number
C post trigger data number
CONF definition file
D sampling time
HD header information
HDR header Information storage region
L recording time
MI work machine information
MID work machine data
PG computer program
TSR time-series data storage region

The invention claimed is:
1. A work machine comprising:
a controller including:
a storage unit configured to:
store work machine information;
store definition information which is information for generating work machine data including time-series data in which data collected at multiple points in time from a time at which a trigger occurs making a point as a reference time are selected as the time-series data for at least one type of work machine information from among multiple types of work machine information;
store a trigger time data which includes at least one piece of work machine information of a type different from the time-series data, in which data collected at the time at which the trigger occurs as the reference time is selected as the trigger time data;
a processing unit configured to:
collect the work machine information;
generate the work machine data from the work machine information collected according to the definition information;
store the work machine data to the storage unit;

store at least a portion of the collected work machine information in the storage unit when the trigger is received,
wherein the processing unit generates the time-series data by selecting the data collected of the one-type of work machine information at a series of points of time including before, after and at the reference time at which the trigger occurred, the processing unit stores the time-series data and the trigger time data in response to an occurrence of the trigger, and a number of pieces of data included in the trigger time data is less than a number of pieces of data included in the time-series data.

2. The work machine according to claim 1, wherein the trigger time data are one piece of data for one type of work machine information.

3. The work machine according to claim 1, wherein the definition information can be rewritten by an external unit provided outside of the controller.

4. The work machine according to claim 1, wherein the trigger time data include at least an external air temperature, an atmospheric pressure, and position information about the work machine.

5. The work machine according to claim 1, further comprising a plurality of the controllers, wherein each of the controllers can individually set the definition information.

6. The work machine according to claim 1, further comprising a communication unit for communicating with the external unit provided outside of the controller,
wherein the definition information can be rewritten by the external unit provided outside of the controller by wireless communication via the communication unit.

7. The work machine according to claim 1, wherein the trigger time data are described in a region provided at a head of the time-series data and describing at least information for interpreting the time-series data.

8. The work machine according to claim 1, wherein, for a same type of work machine information, the processing unit generates multiple different pieces of work machine data having different combinations of a number of pieces of work machine information collected by the processing unit before the trigger, a number of pieces of work machine information collected by the processing unit after the trigger, and a time interval with which the processing unit collects the work machine information.

9. The work machine according to claim 1, wherein the type of the work machine information can be changed.

10. The work machine according to claim 9, wherein the storage unit stores multiple types of definition information.

11. The work machine according to claim 10, wherein the multiple types of definition information can be changed individually from an external unit provided outside of the controller.

12. A work machine comprising:
a controller including:
a first storage unit configured to:
store work machine information;
store definition information which is information for generating work machine data including time-series data in which data collected at multiple points in time from a time at which a trigger occurs making a point as a reference time are selected as time-series data for at least one type of work machine information from among multiple types of work machine information;
store a trigger time data which includes at least one piece of work machine information of a type different from the time-series data and in which data collected at the time at which the trigger occurs as the reference time is selected as the trigger time data;
a second storage unit configured to:
store a command for executing operations;
a processing unit configured to:
generate the work machine data from the work machine information collected according to the definition information;
store the work machine data to the storage unit,
wherein the processing unit generates the time-series data by selecting the data collected of the one-type of work machine information at a series of points of time including before, after and at the reference time at which the trigger occurred, the processing unit stores the time-series data and the trigger time data in response to an occurrence of the trigger, and a number of pieces of data included in the trigger time data is less than a number of pieces of data included in the time-series data.

13. The work machine according to claim 12, wherein, for a same type of work machine information, the processing unit generates multiple different pieces of work machine data having different combinations of a number of pieces of work machine information collected by the processing unit before the trigger, a number of pieces of work machine information collected by the processing unit after the trigger, and a time interval with which the processing unit collects the work machine information.

14. The work machine according to claim 12, wherein the type of the work machine information can be changed.

15. The work machine according to claim 14, wherein the storage unit stores multiple types of definition information.

16. The work machine according to claim 15, wherein the multiple types of definition information can be changed individually from an external unit provided outside of the controller.

* * * * *